Feb. 17, 1953  R. M. BROWN  2,628,447
WATER AERATOR FOR FISH CONTAINERS
Filed Nov. 28, 1949  2 SHEETS—SHEET 1

Royce M. Brown
INVENTOR.

Feb. 17, 1953  R. M. BROWN  2,628,447
WATER AERATOR FOR FISH CONTAINERS
Filed Nov. 28, 1949  2 SHEETS—SHEET 2

Royce M. Brown
INVENTOR.

Patented Feb. 17, 1953

2,628,447

UNITED STATES PATENT OFFICE 2,628,447

WATER AERATOR FOR FISH CONTAINERS

Royce M. Brown, Albuquerque, N. Mex.

Application November 28, 1949, Serial No. 129,822

1 Claim. (Cl. 43—57)

This invention relates to novel and useful improvements in minnow pails and aerators therefor.

An object of this invention is to agitate the liquid in a minnow pail in order to cause aeration, by agitating the liquid in a liquid chamber which is formed by a screen member, said screen member also forming a guard to prevent the fish from being struck by the agitator, the liquid following a pattern, being urged toward the inside surface of a cylindrical baffle and upwardly through a screen at the back thereof toward the agitating chamber.

Another object of this invention is to rockingly support the pail by means of a curved bottom so that the pail is supported unsteadily whereby rocking causes additional agitation, and hence aeration, inasmuch as the liquid is agitated by passage through various screens.

A still further object of this invention is to provide an aerator which is adapted to be disposed on a conventional pail or a pail with an arcuate bottom forming an unsteady base.

Ancillary objects and features of novelty will become apparent in following the description of the illustrated form of the invention.

In the drawings:

Figure 4 is a fragmentary sectional view showing a portion of the screen which forms the agitation chamber and illustrating a modification whereby the fact that one or more thicknesses of screen may be employed is illustrated.

Figure 5 is a side elevational view of the device with the same being shown in tilted position in phantom outline.

Figure 1:
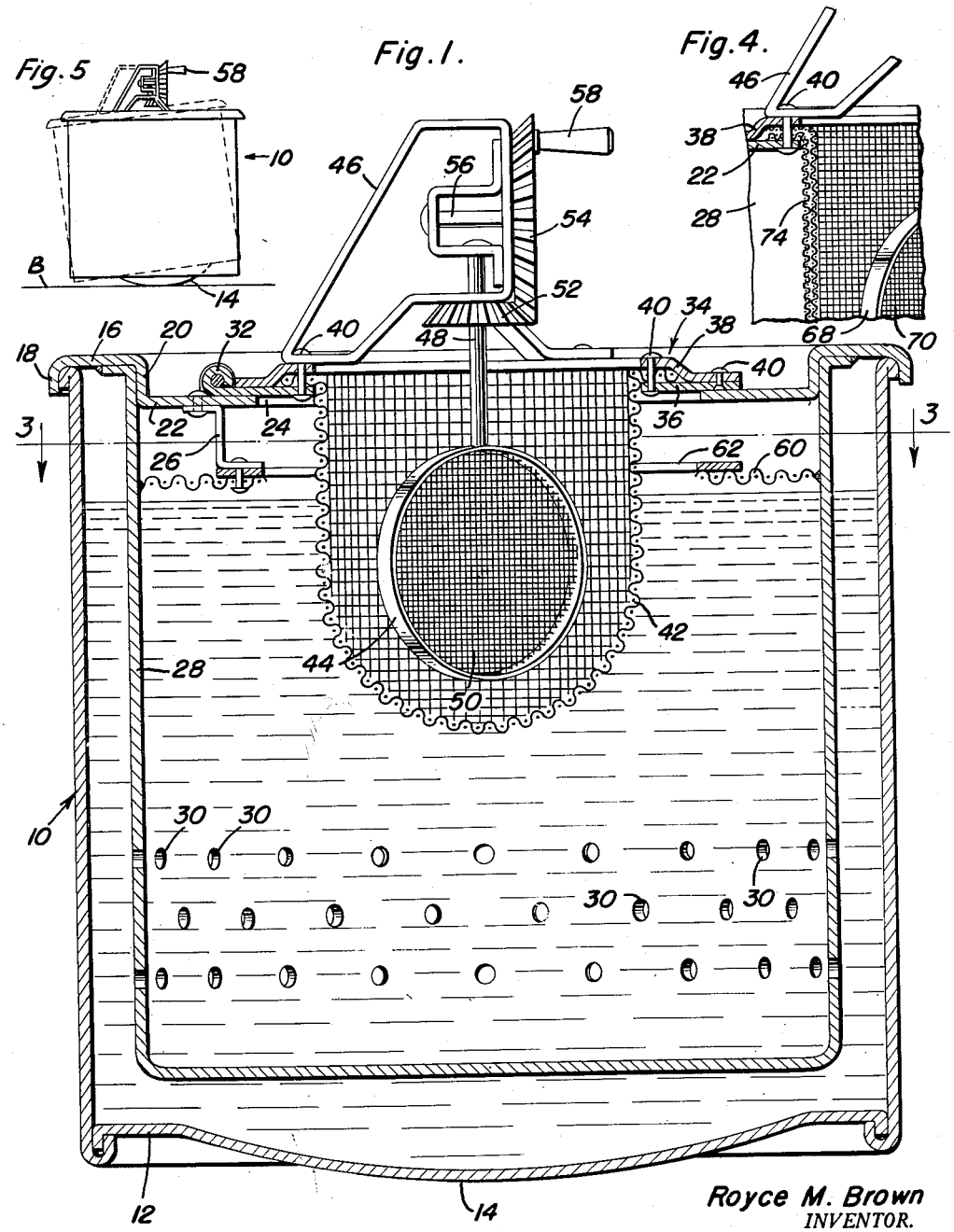
Figure 1 is a sectional view of the device.
Figure 2:
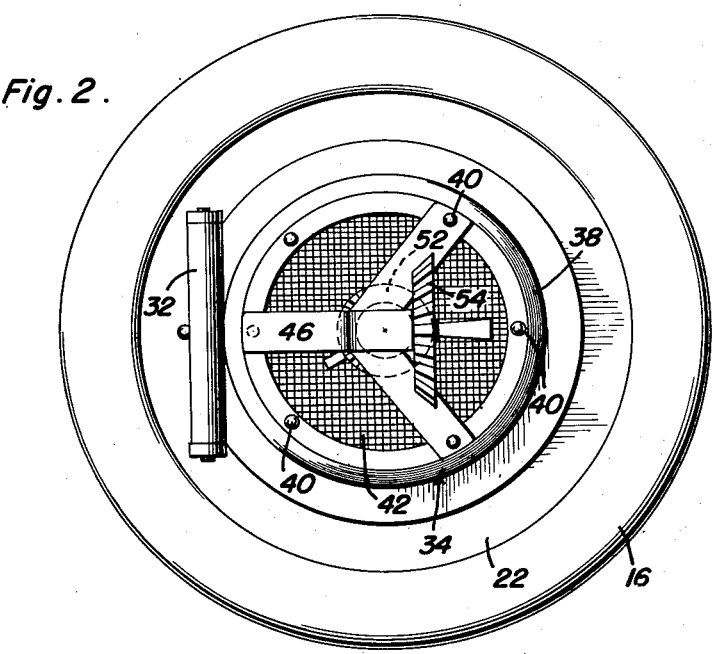
Figure 2 is a plan view of the device of Figure 1.
Figure 3:
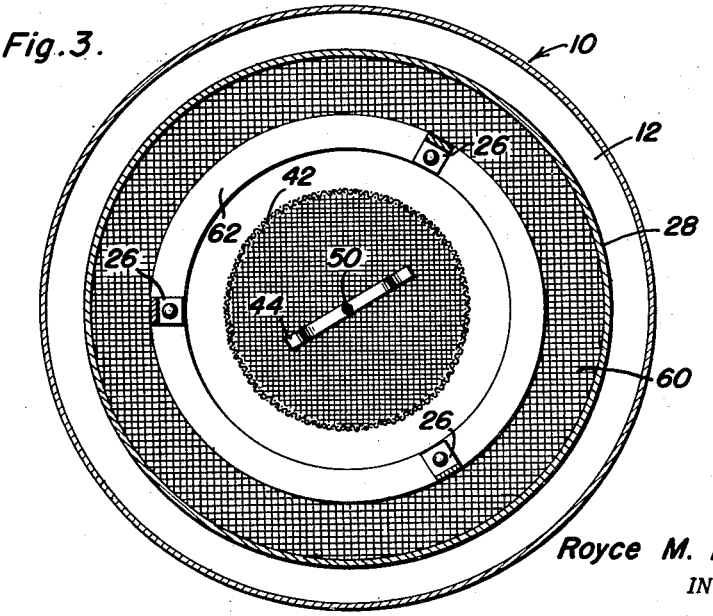
Figure 3 is a sectional view taken substantially on the line 3—3 of Figure 1 and in the direction of the arrows.

The attendant beneficial results of aerating the liquid in a minnow pail are well known. In my invention I have provided an improved means for aerating the liquid in a minnow pail which may be adaptable for use in connection with a conventional pail or the one illustrated in Figure 1 and generally indicated at 10. This pail includes vertical sides together with a bottom 12 having a concavo-convex or smoothly curved center section 14 which forms an unsteady seat for the pail. Accordingly, the pail is very easily rocked in response to outside stimuli such as the normal jars of an ordinary vehicle. Note particularly Figure 5 wherein the pail is shown in rocking motion on the base B.

A cover is supplied for the pail and consists of a circular band 16 having a downturned flange 18 which is disposed on the upper edge of the side walls of the pail 10. Integrally connected with the ring 16 is a vertical flange 20 which integrally joins the center disk portion 22 with the flange 16. This center disk portion has an opening 24 therein and one or more hangers 26 depending from the disk 22 intermediate the aperture or opening 24 and the vertical flange 20. A substantially cylindrical baffle 28 is welded or otherwise rigidly fixed to the under surface of the flange 16 and depends within the pail 10, being spaced from the bottom thereof. The baffle has a series of apertures 30 adjacent the bottom thereof for free passage of liquid into and from the space between the baffle 28 and the walls of the pail or container 10.

A hinge 32 is disposed on the disk 22 supporting the door 34. This door consists of a bottom plate 36 having a central opening together with a ring 38 which is seated thereon and held in place by means of rivets 40 or the like. Disposed between the ring 38 and the lower plate 36 is a foraminous member 42, preferably a screen which depends through the opening 24 and terminates within the cylindrical baffle 28. This screen 42 forms a fish guard, preventing the fish from being struck by a paddle 44 and provides a means for causing the water to be agitated as it passes into and from the agitating chamber.

A frame type support 46 is disposed on the ring 38 and movable therewith. This support has a shaft 48 depending therefrom with the paddle 44 fixed thereto. The center part of the paddle 50 is formed of screen or other foraminous material so as to cause further agitation of the liquid as the paddle is rotated. A pinion 52 is fixed to the shaft 48 and is in mesh with the gear 54. This gear is mounted on a shaft 56, carried by the support 46, and has a hand-operating member 58 fixed thereto. Upon operation of the hand operating member 58, the shaft 48 is rotated through the gearing, thereby causing rotation of the paddle 44. This rotation in turn imparts agitating movement of the water in the liquid chamber, causing it to be urged outwardly towards the baffle 28 and upwardly along the walls thereof so as to be admixed with the air above the water level in the pail, causing water aeration.

As the water moves upwardly along the walls thereof, it passes through a screen 60 which is fixed along its outside edges to the inside surface of the baffle 28 and also fixed to a ring 62, secured within the baffle 28 by means of the hangers 26. The ring 62 is spaced slightly from the cover but is located above the bottom of the screen member 42.

Referring now to Figure 4, a fragmentary portion of a paddle 68 is illustrated. This paddle includes a screen 70 or other foraminous member. There is also illustrated a portion of the agitation chamber defining member which is equivalent to the member 42. This agitating defining member 74 consists of two thicknesses of screen held in juxtaposition, thereby forming a double thickness agitation member. In lieu of the screen 60, a double thickness may be employed, as found desirable. If it is desirable to use several additional thicknesses in any of the described elements wherein foraminous material is used, this may be done.

Having described the invention, what is claimed as new is:

In combination with a fish pail, an aerator comprising a cover plate disposed on said pail and having an opening, a support bracket carried by said cover, a foraminous paddle rotatably mounted on said support bracket, gearing carried by said support for operating said paddle, and a cylindrical baffle disposed in said pail and secured to said cover plate, an agitation chamber below said opening and defined by a screen secured to said cover plate, said screen forming a guard to prevent the fish from being struck by said paddle, said baffle having apertures in the lower part thereof for passage of liquid from and into the space between the pail and the baffle, a hanger secured to said cover plate and located within said pail, and a screen secured to said hanger through which at least some of the agitated liquid is adapted to pass, said pail having a curved bottom to constitute an unsteady base for the pail to cause agitation of the liquid in the pail by rocking motion of the entire pail.

ROYCE M. BROWN.

REFERENCES CITED

The following references are of record in the file of this patent:

UNITED STATES PATENTS

| Number | Name | Date |
|---|---|---|
| 202,887 | Straub | Apr. 23, 1878 |
| 353,074 | Laubach | Nov. 23, 1886 |
| 414,566 | Nelleson | Nov. 5, 1889 |
| 925,625 | Rippy | June 22, 1909 |
| 1,197,447 | Covert | Sept. 5, 1916 |
| 1,611,310 | Grant | Dec. 21, 1926 |
| 2,137,397 | Haldeman | Nov. 22, 1938 |
| 2,194,037 | Thuma | Mar. 19, 1940 |
| 2,261,830 | Ditner | Nov. 4, 1941 |
| 2,294,136 | Smith | Aug. 25, 1942 |
| 2,471,573 | Lumpkin | May 31, 1949 |

FOREIGN PATENTS

| Number | Country | Date |
|---|---|---|
| 12,151 | Great Britain | Dec. 19, 1911 |
| 541,060 | Germany | July 31, 1930 |